United States Patent
Cannenterre et al.

(10) Patent No.: US 10,056,842 B2
(45) Date of Patent: Aug. 21, 2018

(54) QUASI-RESONANT VALLEY LOCKOUT WITHOUT FEEDBACK REFERENCE

(71) Applicant: SEMICONDUCTOR COMPONENTS INDUSTRIES, LLC, Phoenix, AZ (US)

(72) Inventors: Stephanie Cannenterre, Colomiers (FR); Christophe Basso, Pibrac (FR)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

(21) Appl. No.: 15/262,326

(22) Filed: Sep. 12, 2016

(65) Prior Publication Data
US 2018/0076721 A1    Mar. 15, 2018

(51) Int. Cl.
*H02M 3/335*  (2006.01)
*H02M 1/08*   (2006.01)
*H02M 1/00*   (2006.01)

(52) U.S. Cl.
CPC ......... *H02M 3/33523* (2013.01); *H02M 1/08* (2013.01); *H02M 2001/0009* (2013.01); *H02M 2001/0058* (2013.01)

(58) Field of Classification Search
CPC ................ H02M 2001/0058; H02M 3/335
See application file for complete search history.

(56) References Cited

U.S. PATENT DOCUMENTS

| | | | |
|---|---|---|---|
| 8,085,027 B2 | 12/2011 | Lin et al. | |
| 8,391,027 B2 | 3/2013 | Lidak et al. | |
| 2002/0186571 A1* | 12/2002 | Tsuge | H02M 3/3385 363/21.01 |
| 2003/0090254 A1* | 5/2003 | Strijker | H02M 3/33515 323/283 |
| 2008/0278225 A1* | 11/2008 | Hu | H02M 3/33507 327/543 |
| 2011/0299305 A1* | 12/2011 | Tzeng | H02M 3/33515 363/21.13 |
| 2014/0016365 A1* | 1/2014 | Maruyama | H02M 3/33507 363/21.02 |
| 2014/0029316 A1* | 1/2014 | Adragna | H02M 3/33523 363/21.18 |
| 2014/0177286 A1* | 6/2014 | Sonobe | H02M 3/33507 363/21.01 |
| 2016/0218630 A1* | 7/2016 | Huang | H02M 3/33515 |
| 2017/0214325 A1* | 7/2017 | Chang | H02M 3/33507 |

OTHER PUBLICATIONS

Fairchild Semiconductor, "Design Guidelines for RCD Snubber of Flyback Converters," Application Note AN-4147, Rev. 1.1.0, 2006, 5 pp.

(Continued)

*Primary Examiner* — Harry Behm
(74) *Attorney, Agent, or Firm* — Robert D. Atkins; Patent Law Group: Atkins and Associates, P.C.

(57) ABSTRACT

A method of controlling a power supply includes detecting a transition of the power supply to discontinuous conduction mode (DCM), and locking an operating point of the power supply after detecting the transition. The operating point can be unlocked when a timer expires or when a feedback voltage slope exceeds a threshold.

16 Claims, 10 Drawing Sheets

(56) References Cited

OTHER PUBLICATIONS

ON Semiconductor, "Quasi-Resonant Current-Mode Controller for High-Power ac-dc Adapters," Publication Order No. AND8331/D, Jun. 2008, 16 pp.
Infineon Technologies AG, "Quasi-resonant PWM Controller," Datasheet ICE2QS01, Version 2.2, Jul. 4, 2011, 17 pp.
Leadtrend, Technology Corporation, "Multi-Mode PWM Controller of Flyback with Integrated BNI/BNO and Protection," Datasheet LD5525E-DS-00, May 2016, 16 pp.
ON Semiconductor, "Critical Conduction GreenLine SMPS Controller," Publication Order No. MC3364/D, Rev. 18, Nov. 2010, 16 pp.
ON Semiconductor, "Single Ended PWM Controller Featuring QR Operation and Soft Frequency Foldback," Publication Order No. NCP1205/D, Rev. 10, Dec. 2010, 17 pp.
ON Semiconductor, "PWM Current-Mode Controller for Free Running Quasi-Resonant Operation," Publication Order No. NCP1207A/D, Rev. 11, Dec. 2010, 17 pp.
ON Semiconductor, "Quasi-Resonant Current Mode Controller for High Power Universal Off-Line Supplies," Publication Order No. NCP1336/D, Rev. 2, Apr. 2014, 26 pp.
Richtek Technology Corporation, "SmartJitter Multi-Mode Flyback Controller," Datasheet RT7738, Nov. 2014, 24 pp.

\* cited by examiner

QUASI-RESONANT VALLEY LOCKOUT WITHOUT FEEDBACK REFERENCE

BACKGROUND

Electronic devices commonly require a direct current (DC) voltage of appropriate level for proper operation. A manufacturer of an electronic device provides for a power signal to be connected to the electronic device, which is used to power the semiconductor packages and other electric components of the electronic device. In many cases, the provided power signal is at a different voltage potential than the voltage required to operate the individual components of the electronic device. The manufacturer will generally provide a power conversion circuit to generate a steady DC voltage signal at a voltage potential usable by the electronic device. Switch-mode power supplies (SMPS) are common due to efficiency advantages.

An SMPS may be located within an electronic device, or located externally and connected to the electronic device by a cable. The cable is coupled to the electronic device using a detachable plug in some embodiments. The plug may include both power and data lines, e.g., when an electronic device is a cell phone, tablet computer, or other mobile device, and power is provided by a Universal Serial Bus (USB) interface. In some embodiments, electronic devices follow the USB Power Delivery (USB-PD) protocol to negotiate a voltage potential for power delivery by an external SMPS.

An SMPS operates by switching an input power signal on and off repeatedly to create a relatively high-frequency power signal. The switched power signal is routed through a transformer or inductor, and then rectified and filtered to create a steady DC power signal. The output power signal is commonly rectified by one or more diodes, or a transistor is used for synchronous rectification.

A circuit diagram for one exemplary embodiment of a flyback SMPS 100 is illustrated in FIG. 1. SMPS 100 is formed by components disposed on a circuit board, printed circuit board, or other substrate 101. In some embodiments, SMPS 100 is split across multiple substrates 101. SMPS 100 is divided into a primary side 102 and a secondary side 104, which are delineated by transformer 105. In non-isolated topologies, an inductor is used instead of transformer 105. Transformer 105 includes a primary winding 106 as part of primary side 102 and a secondary winding 108 as part of secondary side 104. Primary side 102 of SMPS 100 is made up of the components electrically connected to primary winding 106. Secondary side 104 of SMPS 100 is made up of the components electrically connected to secondary winding 108. Transformer 105 provides DC isolation between primary side 102 and secondary side 104. Alternating current (AC) signals through primary winding 106 are transferred to secondary winding 108 by magnetic coupling, while any DC offset is substantially ignored.

Primary side 102 includes a power input at bulk voltage ($V_{BULK}$) node 110. In some embodiments, $V_{BULK}$ node 110 receives an AC power signal provided by an electric utility at, e.g., 110 or 230 volts AC, which has been rectified. The AC electric signal is routed to a residence, commercial office building, or other premises by power mains, and input to the electronic device including SMPS 100 by plugging the device into a wall outlet. A diode bridge or other rectifier circuit rectifies the input AC main signal to include positive voltage values at $V_{BULK}$ node 110. In other embodiments, a power signal is provided to $V_{BULK}$ node 110 by other means, e.g., from solar cells or a battery pack. A capacitor 111 is coupled between $V_{BULK}$ node 110 and ground node 113 to further filter the input power signal. Ground node 113 operates as the ground reference voltage for the electrical components of primary side 102.

Electric current from $V_{BULK}$ node 110 through primary winding 106 to ground node 113 is turned on and off by primary MOSFET 112. Primary MOSFET 112 includes a drain terminal 115 coupled to primary winding 106 opposite $V_{BULK}$ node 110, a gate terminal coupled to primary flyback controller 120 at circuit node 114 (DRV), and a source terminal coupled to current sense resistor 118 at current sense (CS) node 119. The source and drain terminals of primary MOSFET 112 are conduction terminals, and the gate terminal is a control terminal. Controller 120 turns on, or enables electric conduction through, primary MOSFET 112 by providing a positive voltage potential at the gate terminal of the MOSFET via DRV node 114 coupled to a drive output of the controller. In some embodiments, additional driver circuitry is coupled between controller 120 and the gate of MOSFET 112. When primary MOSFET 112 is turned on, electric current flows from $V_{BULK}$ node 110 to ground node 113 through primary winding 106, primary MOSFET 112, and resistor 118 in series. Controller 120 turns off primary MOSFET 112 by outputting a ground voltage potential to the gate of primary MOSFET 112. While primary MOSFET 112 is off, no significant current flows from $V_{BULK}$ node 110 through primary winding 106.

In the ideal case, an n-channel MOSFET exhibits zero resistance when its gate has a positive voltage potential, and exhibits infinite resistance when its gate is at ground potential. MOSFET 112 is an n-channel MOSFET that operates as a switch opened and closed by a control signal from controller 120 coupled to the MOSFET's gate terminal at DRV node 114. A switch, e.g., MOSFET 112, being closed is also referred to as the switch being "on," because electric current is able to flow between conduction terminals of the switch. An open switch is referred to as being "off" because current does not flow significantly between the conduction terminals of the switch. While the primary switch of SMPS 100 is illustrated as an re-channel MOSFET, other types of electronically controlled switches, e.g., bipolar-junction transistors (BJTs), p-channel MOSFETs, gallium arsenide transistors, junction gate field-effect transistor, other types of field-effect transistors (FETs), and other types of electronic switches, are used in other embodiments. FETs include source and drain terminals, which are conduction terminals, and a gate terminal as a control terminal. BJTs include emitter and collector terminals, which are conduction terminals, and a base terminal as a control terminal.

Controller 120 determines when to switch primary MOSFET 112 by observing the magnitude of current through primary winding 106. Resistor 118 creates a voltage potential difference between ground node 113 and CS node 119 when electric current flows through the resistor. The voltage potential across resistor 118, as observed at CS node 119, is approximately proportional to the current through primary winding 106. CS node 119 is coupled to a current sense input pin of controller 120. Controller 120 observes the voltage potential at CS node 119 to determine the electric current magnitude through primary winding 106.

While controller 120 has primary MOSFET 112 turned on, electric current through primary winding 106 increases approximately linearly and magnetizes transformer 105. When controller 120 turns off primary MOSFET 112, electric current through primary winding 106 is substantially stopped. The magnetic energy stored in transformer 105 while MOSFET 112 was on is output as electric current through secondary winding 108 while MOSFET 112 is off, creating a positive voltage potential at voltage output ($V_{OUT}$) node 124 relative to ground node 126. Ground node 126 operates as the ground reference voltage for electrical components of secondary side 104. SMPS 100 is an isolated topology, meaning a separate primary side ground node 113 and secondary side ground node 126 are used. The voltage potential of ground node 126 is allowed to float relative to ground node 113.

The voltage potential at $V_{OUT}$ node 124 charges capacitor 128 and powers additional circuit components of an electronic device connected to SMPS 100 as a load. The cycle repeats when controller 120 turns on primary MOSFET 112 to again magnetize transformer 105. Capacitor 128 provides power to $V_{OUT}$ node 124 while primary MOSFET 112 is on, and transformer 105 is being magnetized. Diode 130 rectifies current through secondary winding 108 by reducing electric current flowing from $V_{OUT}$ node 124 to ground node 126 through secondary winding 108 while transformer 105 is being magnetized from primary side 102.

Feedback is provided from secondary side 104 to primary side 102 by Zener diode 154 and optocoupler 155. Optocoupler 155 includes an LED 156 and a phototransistor 158. If the voltage potential at $V_{OUT}$ node 124 exceeds the Zener voltage of Zener diode 154 summed with the voltage drop of LED 156, current flows from $V_{OUT}$ node 124 to ground node 126 through Zener diode 154 and LED 156 in series. Photons emitted by LED 156 hit phototransistor 158, which turns on the phototransistor and increases the coupling of feedback (FB) node 160 to ground node 113. FB node 160 is coupled to a feedback input pin or terminal of controller 120. Capacitor 159 filters the voltage potential at FB node 160. As current through LED 156 is increased, the coupling of FB node 160 to ground node 113 through phototransistor 158 is increased, and the voltage potential of FB node 160 is further reduced.

The voltage potential at FB node 160 increases as the load on SMPS 100 is reduced, indicating that less power needs to be transferred from primary side 102 to secondary side 104 through transformer 105. Controller 120 delays turning on MOSFET 112 between power cycles for a longer period of time as the load on SMPS 100 is reduced. When the load on SMPS 100 is sufficiently reduced, SMPS 100 transitions from continuous conduction mode (CCM) to discontinuous conduction mode (DCM). In CCM, energy stored in transformer 105 is not completely discharged each power cycle. MOSFET 112 is turned on to begin charging transformer 105 while current is still flowing through secondary winding 108 from ground node 126 to $V_{OUT}$ node 124.

In DCM, the magnetic energy stored in transformer 105 is substantially discharged and current through secondary winding 108 substantially ceases. Diode 130 becomes reverse biased to limit current from $V_{OUT}$ node 124 to ground node 126 through secondary winding 108. While MOSFET 112 remains off, and approximately zero current flows through secondary winding 108, the inductance of primary winding 106 resonates with the output capacitance of MOSFET 112. The resonance creates voltage potential fluctuations at drain terminal 115 of MOSFET 112. Efficiency of SMPS 100 is increased by switching MOSFET 112 back on while the drain voltage of MOSFET 112 is approximately at a minimum, also known as a voltage potential valley. Switching on MOSFET 112 in a drain voltage potential valley reduces switching losses associated with turning on MOSFET 112 by reducing the voltage potential across the conduction terminals of MOSFET 112 during switching.

In a classic fixed frequency SMPS 100, MOSFET 112 is turned back on at a time determined by the voltage potential at FB node 160, without regard to the voltage potential at drain terminal 115 of MOSFET 112. Efficiency of SMPS 100 varies with output power because the timing of switching MOSFET 112 varies. Overall efficiency is higher if MOSFET 112 happens to be turned on near a voltage valley, while the efficiency will be lower if MOSFET 112 is turned on near a voltage peak.

FIG. 2a illustrates switching MOSFET 112 on near a peak of the MOSFET 112 drain voltage. Plot 200 illustrates drain-to-source voltage ($V_{DS}$) of MOSFET 112 over time. Between time 0 and time 1 in FIG. 2a, MOSFET 112 is on, and $V_{DS}$ is approximately zero due to coupling of drain terminal 115 to ground node 113 through MOSFET 112 and resistor 118. At time 1, controller 120 turns off MOSFET 112, and $V_{DS}$ is positive while energy in transformer 105 is transferred to secondary side 104. Beginning at time 2, the magnetic energy stored in transformer 105 is substantially exhausted and no significant current flows through secondary winding 108. Resonance between primary winding 106 and MOSFET 112 carries $V_{DS}$ to minimums, or valleys, at times 3 and 4, with a peak in between. At time 5, $V_{DS}$ is near a peak, and MOSFET 112 is turned back on. Switching losses of MOSFET 112 are significantly increased due to $V_{DS}$ being near a maximum when MOSFET 112 is turned on at time 5.

Plot 210 in FIG. 2b illustrates $V_{DS}$ with MOSFET 112 switched on during the valley at time 4. A slightly higher output power of SMPS 100 means controller 120 turns on MOSFET 112 a little earlier to provide the needed power transfer to secondary side 104. Turning on MOSFET 112 in a voltage valley increases efficiency by reducing switching losses of MOSFET 112. Plot 220 in FIG. 2c illustrates efficiency of SMPS 100 over a range of output power. As output power fluctuates, SMPS 100 will change from switching in valleys to switching in peaks. Efficiency minimums 224 illustrate power output levels where MOSFET 112 is turned on at $V_{DS}$ peaks, as in FIG. 2a. Efficiency maximums 226 illustrate power output levels where MOSFET 112 is turned on at $V_{DS}$ valleys, as in FIG. 2b Designers of switch-mode power supplies seek to maximize efficiency of SMPS 100. One method for increasing efficiency attempts to always switch on MOSFET 112 in $V_{DS}$ valleys. Controller 120 observes $V_{DS}$ and delays turning on MOSFET 112 until a valley is detected. Some controllers wait a certain period of time dictated by the feedback voltage, and then turn on MOSFET 112 when the next valley thereafter is detected. Unfortunately, simply delaying until a valley is observed creates instabilities. When controller 120 switches in a valley, the instantaneous switching cycle is different from the switching cycle imposed by the controller's internal clock. The frequency variation affects output power and the feedback loop reacts by adjusting the peak current. The feedback loop adjustment leads to a new switching event in a different valley from the previous power cycle, either before or after the previous valley. The resulting instability generates acoustic noise and is undesirable.

To increase stability, some valley lockout systems have added hysteresis to the FB node 160 comparison. Once valley switching begins within a certain valley, the output power must move significantly in the opposite direction to return to switching in the previous valley. Using hysteresis to implement valley lockout improves stability, but requires additional comparators implemented on the semiconductor die of controller 120 that increase device size. Moreover, the output power levels at which valley switching occurs depends on various design elements, e.g., input voltage, switching frequency, parasitic inductances, etc. Therefore, difficulty exists for accurately predicting the power level at which the valley number should be changed for all use-cases based on FB node 160. A need exists for a valley lockout mechanism that operates without depending on FB node 160.

DETAILED DESCRIPTION OF THE DRAWINGS

The following describes one or more embodiments with reference to the figures, in which like numerals represent the same or similar elements. While the figures are described in terms of the best mode for achieving certain objectives, the description is intended to cover alternatives, modifications, and equivalents as may be included within the spirit and scope of the disclosure.

Figure 1:
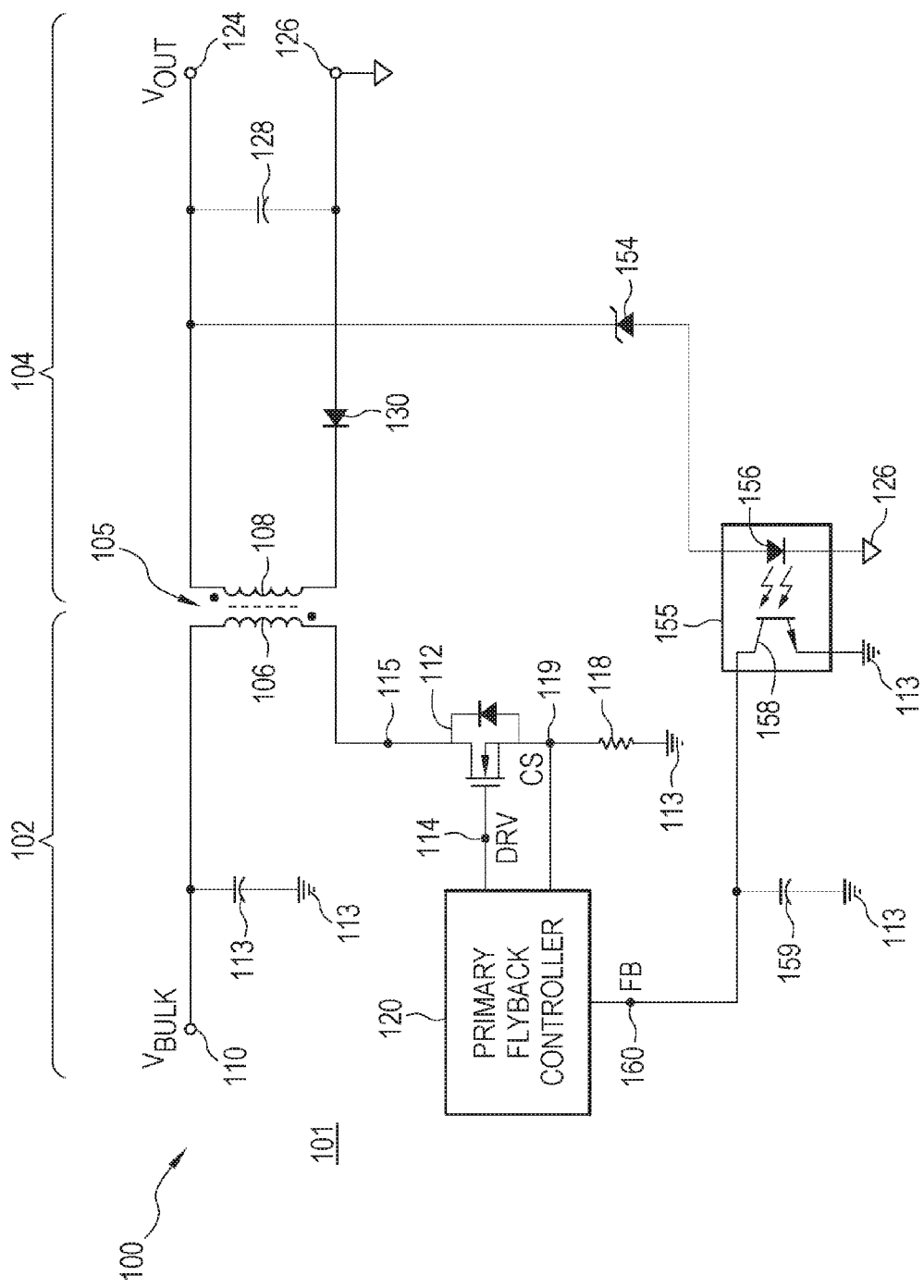
FIG. 1 illustrates an exemplary circuit diagram of a flyback switch-mode power supply (SMPS)
Figure 2A:
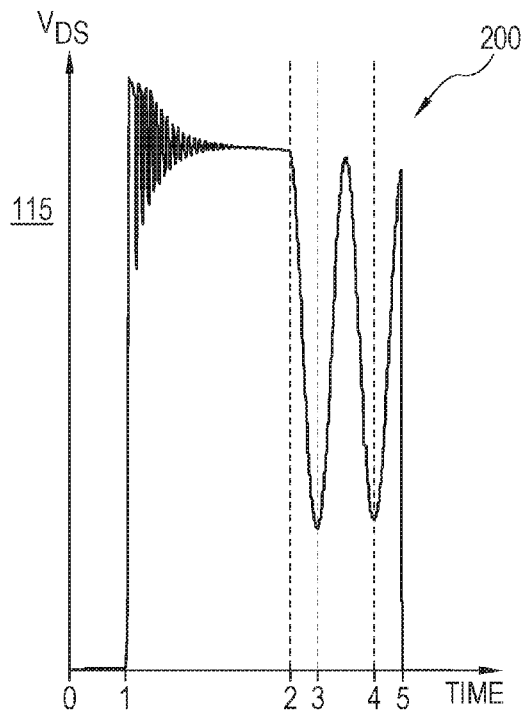
FIGS. 2a-2c illustrate efficiency differences between switching in drain voltage peaks and valleys.
Figure 2B:
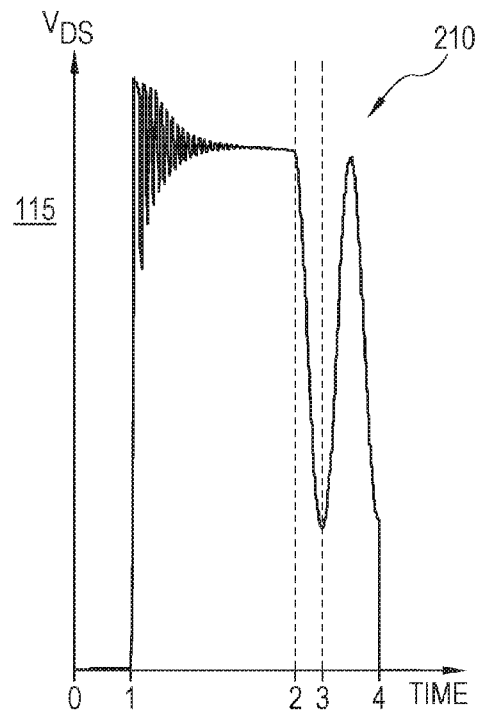
Figure 2C:
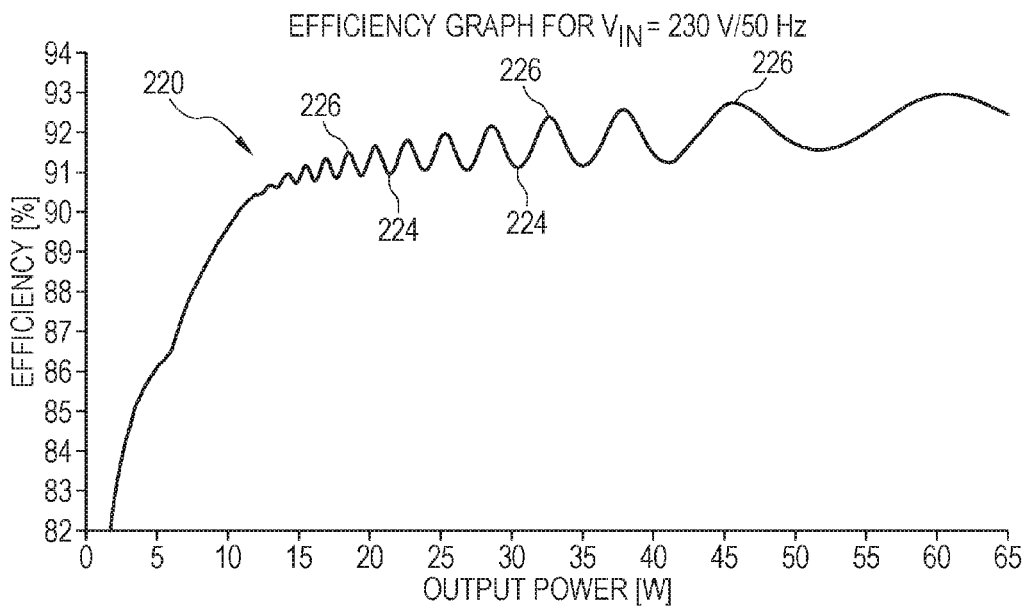
Figure 3:
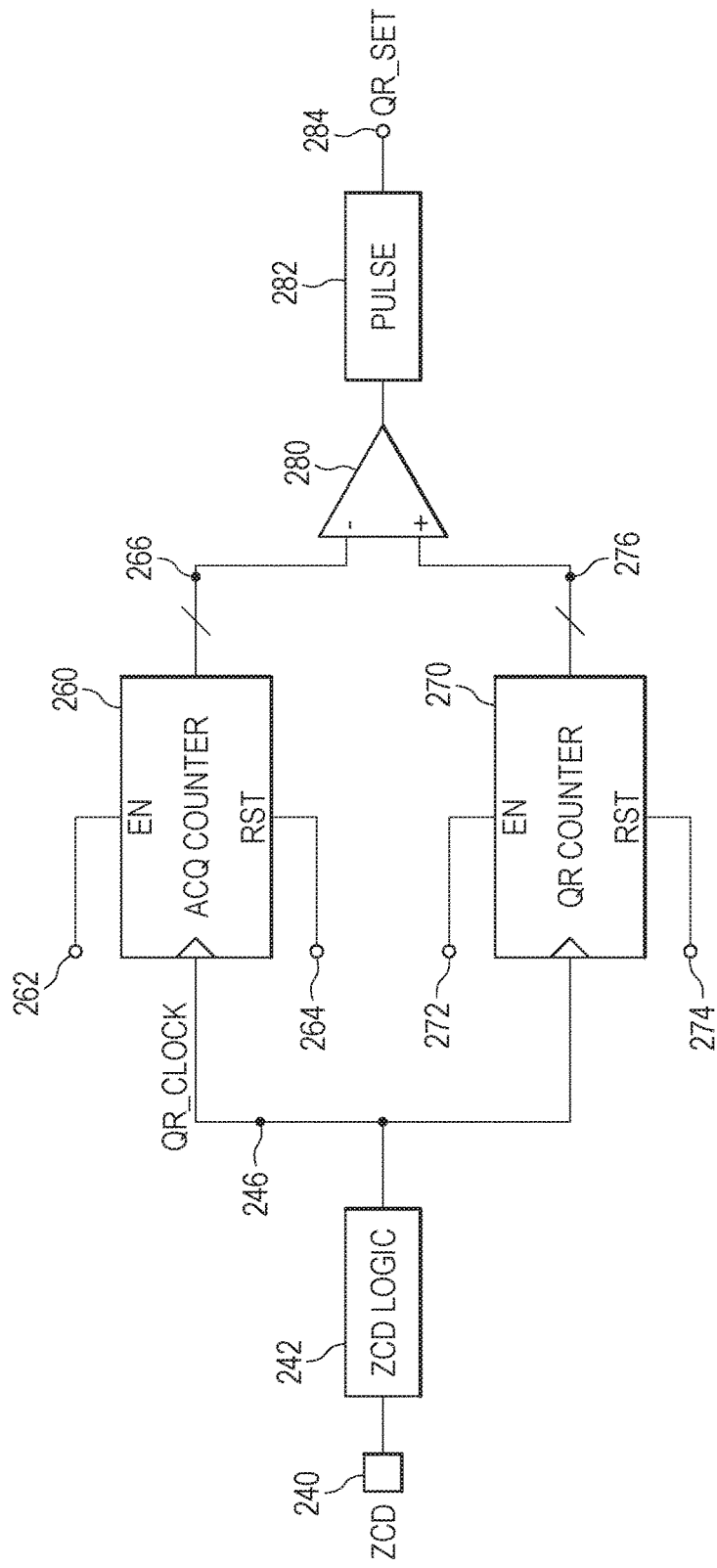
FIG. 3 illustrates a digital comparison between a stored valley number and an instantaneous valley number.

FIG. 3 illustrates a circuit for locking-in a valley number for switching MOSFET 112 without reference to FB node 160. At power-up, or during transient conditions such as abrupt variations of the input voltage or load current, SMPS 100 operates freely and the valley-lockout circuit in FIG. 3 is not used. SMPS 100 may be operating in CCM or DCM. Once SMPS 100 reaches a stable operating point in DCM, acquisition counter 260 is used to take and store a snapshot of the operating conditions. The snapshot is a valley number that SMPS 100 is operating in, stored in acquisition counter 260. The valley lockout circuit in FIG. 3 causes SMPS 100 to continue operating in the valley that was dictated by the operating conditions when the snapshot was stored in acquisition counter 260. A new snapshot is captured periodically, and acquisition counter 260 is updated.

Zero current detect (ZCD) node 240 is an input to controller 120 coupled to an auxiliary winding of transformer 105. The auxiliary winding mirrors the current through secondary winding 108, but is electrically isolated from secondary side 104. ZCD node 240 allows controller 120 to detect when demagnetization of transformer 105 occurs. ZCD logic 242 generates quasi-resonant (QR) clock signal 246 based on the signal received from ZCD node 240. QR clock 246 is used to clock subsequent logic elements along with the resonant oscillations on drain terminal 115.

Figure 4:
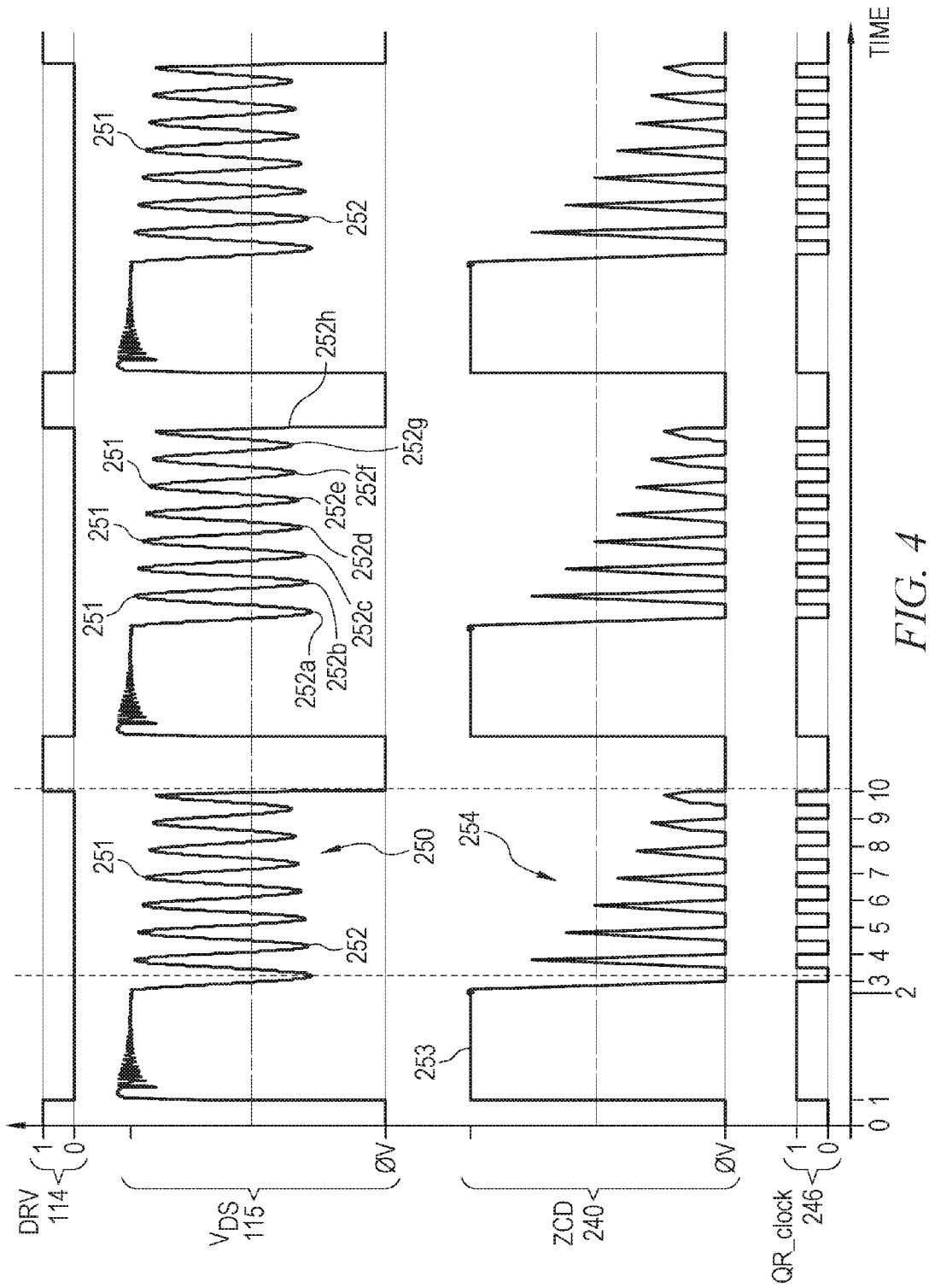
FIG. 4 illustrates generation of a quasi-resonant clock signal from the voltage potential of the drain terminal of a switching MOSFET.

FIG. 4 illustrates ringing 250 at drain node 115 after transformer 105 is demagnetized, and generation of QR clock 246. Ringing 250 includes peaks 251 and valleys 252. MOSFET 112 is switched off at time 1, and drain terminal 115 is at a positive voltage potential. Between time 1 and time 2, transformer 105 is inducing current not only in secondary winding 108, but also the auxiliary winding connected to ZCD node 240. While transformer 105 is demagnetizing between time 1 and time 2, the induced current from the auxiliary winding holds ZCD node 240 at a plateau 253. At time 2, the magnetic energy in transformer 105 has been substantially discharged. Beginning from time 2, primary winding 106 and the output capacitance of MOSFET 112 begin resonating, creating ringing 250 on drain terminal 115. Ringing 250 manifests as a series of pulses 254 on ZCD node 240.

Ringing 250 on drain terminal 115 includes a series of peaks 251 and valleys 252. Controller 120 improves efficiency of SMPS 100 by turning MOSFET 112 back on within a valley 252. Controller 120 may turn MOSFET 112 on during the first valley 252a, second valley 252b, or any subsequent valley of ringing 250. In FIG. 4, controller 120 turns on MOSFET 112 during the eighth valley 252h. Which valley controller 120 switches on MOSFET 112 generally depends on the power output of SMPS 100. If greater power transfer from primary side 102 to secondary side 104 is required, controller 120 turns on MOSFET 112 sooner to begin charging transformer 105 sooner. If less power is being output from SMPS 100 to a load, controller 120 waits for a later valley 252 to turn on MOSFET 112 to extend the time between power cycles.

ZCD logic 242 generates QR clock 246 by comparing ZCD node 240 against a voltage potential threshold. QR clock 246 is a logic zero value when ZCD node 240 is near zero volts, and a logic one value when ZCD node 240 is significantly positive. QR clock 246 includes negative transitions approximately at valleys 252 of ringing 250, e.g., at times 3, 4, 5, 6, 7, 8, 9, and 10 in FIG. 4. A negative transition refers to a binary signal transitioning from a logic one to a logic zero. A positive transition refers to a binary signal transitioning from a logic zero to a logic one value. Sequential logic in controller 120 that uses negative transitions of QR clock 246 as a clock input can operate at each valley 252 observed at drain terminal 115.

In particular, returning to FIG. 3, acquisition counter 260 is clocked by QR clock 246. Acquisition counter 260 also includes an acquisition enable (EN) input 262 and reset (RST) input 264. Acquisition counter 260 increments at each negative edge of QR clock 246 while acquisition enable 262 is asserted and outputs a binary value at acquisition output 266 representative of the number of valleys on drain terminal 115 that occur while enabled. Asserting acquisition reset input 264 resets the value at acquisition output 266 to zero. QR counter 270 is also clocked with QR clock 246, and includes QR enable input 272 and QR reset input 274. QR output 276 includes a binary value representative of a number of valleys on drain terminal 115 that occur while QR enable input 272 is asserted. Asserting QR reset input 274 resets the value at QR output 276 to zero.

Acquisition counter 260 is used to count a number of valleys that occur before controller 120 turns on MOSFET 112 based on FB node 160. Generation of acquisition enable 262 is explained in greater detail below with reference to FIGS. 5a-5b, but is generally based on a relatively slow clock signal to acquire a new valley count periodically. In one embodiment, acquisition counter 260 is reset and enabled for one power cycle every 1-2 milliseconds (ms). Once a value is latched into acquisition counter 260, controller 120 switches within the valley indicated in the acquisition counter 260 rather than based on FB input 160. Controller 120 remains switching at the valley stored in acquisition counter 260 until the slow clock again triggers acquisition counter 260 to count valleys of drain node 115 to determine a new valley to switch in. Controller 120 stops switching in the valley indicated in acquisition counter 260 in other circumstances as described below or as desired.

QR counter 270 counts valleys 252 of ringing 250 on drain terminal 115 once acquisition counter 260 has a value latched in. Comparator 280 compares the valley number stored in acquisition counter 260 against QR counter 270, and asserts a signal to pulse generator 282 when output 266 equals output 276. Pulse generator 282 outputs a brief signal pulse at QR set 284 on each positive transition observed on the signal from comparator 280. The pulse of QR set 284 causes MOSFET 112 to turn on within the valley indicated by acquisition counter 260 because the instantaneous valley number in QR counter 270 is equal to the stored valley number in acquisition counter 260. Moreover, QR clock 246 triggers QR counter 270 during a valley 252, and thus the pulse of QR set 284 occurs within the desired valley. QR counter 270 is then reset in preparation for the next power cycle, when the QR counter will begin counting valleys again and trigger MOSFET 112 to turn on when the value in QR counter 270 again reaches the value in acquisition counter 260.

Controller 120 continues operating SMPS 100 by comparing QR counter 270 against acquisition counter 260 and beginning another power cycle each time the value in QR counter 270 reaches the value in acquisition counter 260. Once the slow clock that enables acquisition counter 260 occurs again, controller 120 will again turn on MOSFET 112 based on FB node 160 rather than by comparing QR counter 270 against acquisition counter 260. Acquisition counter 260 is reset and again counts the valleys until controller 120 turns on MOSFET 112 based on FB node 160. After a new valley number is stored in acquisition counter 260, turning on of MOSFET 112 is determined by the valley number when QR counter 270 equals the new value stored in acquisition counter 260.

The valley number that MOSFET 112 is switched on in is re-acquired on a relatively slow clock. The low-frequency acquisition of a valley number reduces the effects of instabilities by relegating the noise to a controlled period that does not generate significant acoustic noise (e.g. 1-2 ms). Comparator 280 provides a digital comparison between a reference valley number stored in acquisition counter 260 and an instantaneous valley number stored in QR counter 270. The outputs 266 and 276 typically have the same number of bits, and can be made any width to support the desired maximum valley for switching. Valley selection during lockout occurs independent of FB node 160.

Figure 5A:
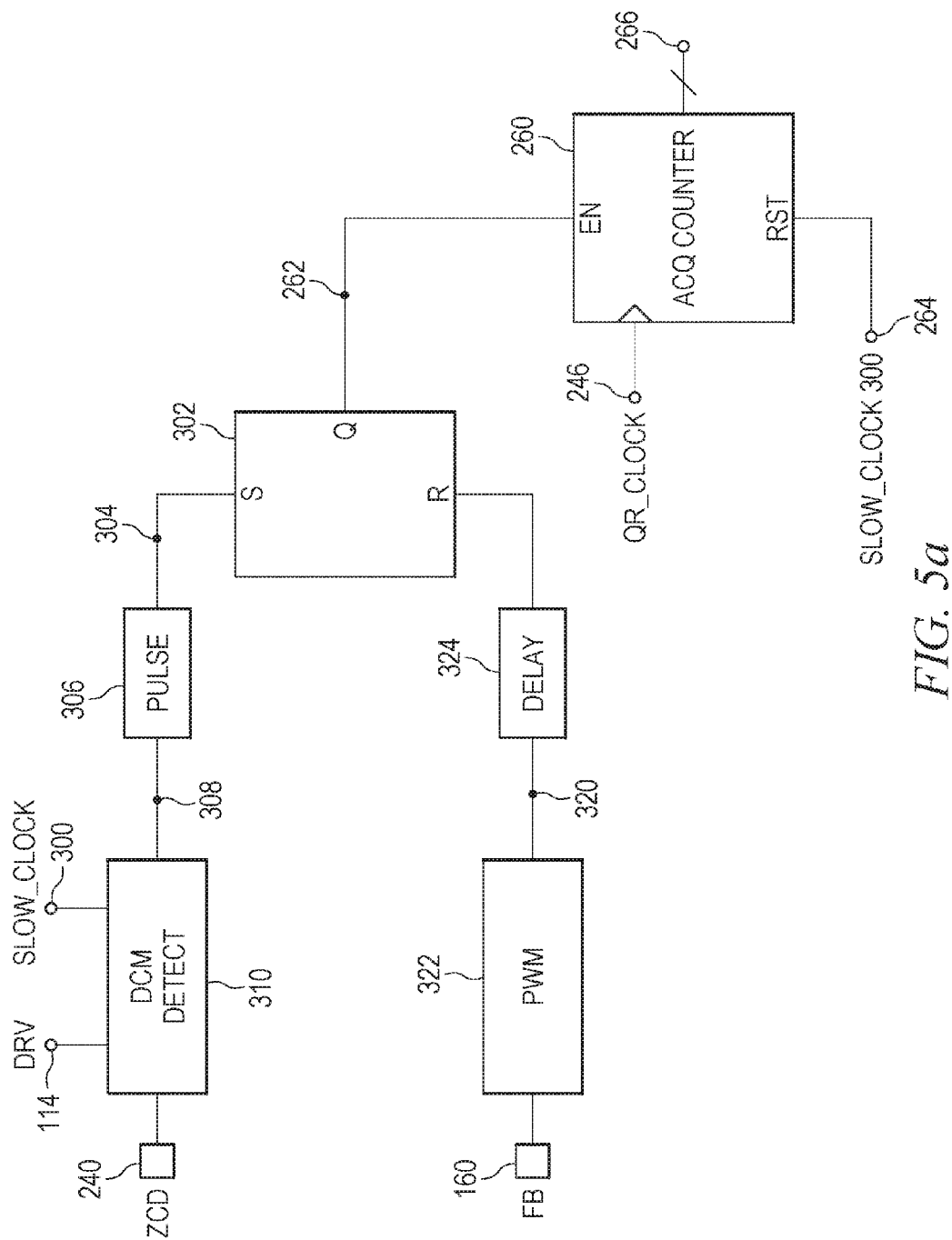
FIGS. 5a-5b illustrate acquisition of a reference valley number.

FIG. 5a illustrates a block diagram for controlling acquisition counter 260 at a relatively low frequency relative to the switching of MOSFET 112. Slow clock 300 is coupled to reset input 264 of acquisition counter 260. Slow clock 300 includes a brief pulse every cycle of the slow clock that resets the value stored in acquisition counter 260 to zero. The frequency of slow clock 300 may be variable based on FB node 160. In order to react rapidly to transient load steps, the frequency of slow clock 300 may be increased to follow abrupt variations of feedback voltage. If the voltage potential of FB node 160 is sufficiently increased, controller 120 forces a maximum switching frequency, e.g., 65 kilohertz (kHz).

Acquisition enable signal 262 is generated by set-reset (SR) latch 302. An SR latch includes a data output (Q) that transitions from a logic zero to a logic one value when a logic one is received at the set (S) input of the SR latch, and transitions from a logic one to a logic zero value when a logic one is received at the reset (R) input of the SR latch. Otherwise, the Q output of an SR latch remains at the previous value of the Q output. SR latch 302 receives a DCM pulse 304 from pulse generator 306 each time DCM signal 308 from DCM detection block 310 transitions from a logic zero value to a logic one value. DCM detection block 310 asserts DCM signal 308 as a logic one value when SMPS 100 is in DCM, so SR latch 302 is set each time SMPS 100 enters DCM.

DCM detection block 310 receives ZCD node 240, DRV signal 114, and slow clock 300 as inputs. DCM detection block 310 compares ZCD node 240 against a threshold, similar to the generation of QR clock 246, but compares ZCD node 240 against a higher voltage potential threshold. Therefore, DCM detection block 310 recognizes a falling voltage potential of drain terminal 115 just prior to falling edges of QR clock 246. DCM detection block 310 recognizes SMPS 100 is in DCM when ZCD node 240 falls below the voltage threshold while MOSFET 112 is off, i.e., while DRV signal 114 is a logic zero value. Under CCM, ZCD node 240 is typically only under the voltage threshold when MOSFET 112 is switched on to connect drain terminal 115 to ground node 113 through resistor 118. However, in DCM, the voltage potential of ZCD node 240 falls based on ringing 250 rather than MOSFET 112 switching. MOSFET 112 remains off during ringing 250, and ZCD node 240 falling below the relevant threshold sets a latch in DCM detect block 310 that asserts DCM signal 308. When DCM signal 308 experiences a positive transition, pulse generator 306 generates a logic one pulse at DCM pulse 304, setting SR latch 302 and enabling acquisition counter 260.

DCM detection block 310 also includes slow clock 300 as an input. Pulses of slow clock 300 occur when MOSFET 112 is next turned on after a timer expires. Pulses of slow clock 300 cause DCM detection block 310 to be kicked out of DCM, and DCM signal 308 is de-asserted. When ringing 250 next occur on drain terminal 115, DCM detection block 310 recognizes DCM and asserts DCM signal 308 again, which results in another DCM pulse 304 from pulse generator 306 that again enables acquisition counter 260. Therefore, acquisition counter 260 is enabled when SMPS 100 initially enters DCM, and each time a pulse of slow clock 300 occurs thereafter.

Acquisition enable signal 262 remains high until main clock 320 is a logic one at the reset input of SR latch 302. Main clock 320 is the main clock of SMPS 100 that normally turns on MOSFET 112. Main clock 320 turns on MOSFET 112 when DCM signal 308 is a logic zero value, i.e., when SMPS 100 is operating in CCM or for the power cycle after slow clock 300 is asserted. QR set 284 turns on MOSFET 112 when DCM signal 308 is a logic one value. Main clock 320 can operate in a fixed frequency, e.g., 65 kHz or in voltage-controlled oscillator (VCO) mode. In some embodiments, the VCO control loop is slowed down using a low-pass filter (LPF) to ensure stable response. Pulse-width modulation (PWM) block 322 compares the voltage potential of CS node 119 against the voltage potential of FB node 160 to determine when to turn MOSFET 112 off using main clock 320, and then leaves MOSFET 112 off for an amount of time determined by FB node 160. PWM block 322 includes a VCO with an input coupled to FB node 160 and an output that generates main clock 320. A higher voltage potential of FB node 160 means that the voltage potential of $V_{OUT}$ node 124 has fallen, and MOSFET 112 should stay off for a shorter period of time. If FB node 160 is at a lower voltage potential, less power is needed at secondary side 104, and MOSFET 112 can remain off for a longer period of time.

Acquisition enable signal 262 is reset to a logic zero value when MOSFET 112 is turned on normally based on FB node 160. Clearing acquisition enable signal 262 locks in the present valley number stored in acquisition counter 260 as controller 120 turns on MOSFET 112. A delay circuit 324 is coupled between PWM block 322 and the reset input of SR latch 302 to ensure that a final negative transition of QR clock 246 increments acquisition counter 260 prior to main clock 320 resetting SR latch 302. Acquisition counter 260 then contains the number of valleys 252 that occurred before MOSFET 112 was turned on by PWM block 322. Acquisition counter 260 remembers and outputs the counted number of valleys until slow clock 300 is again asserted to reset the acquisition counter 260 and set acquisition enable signal 262.

Figure 5B:
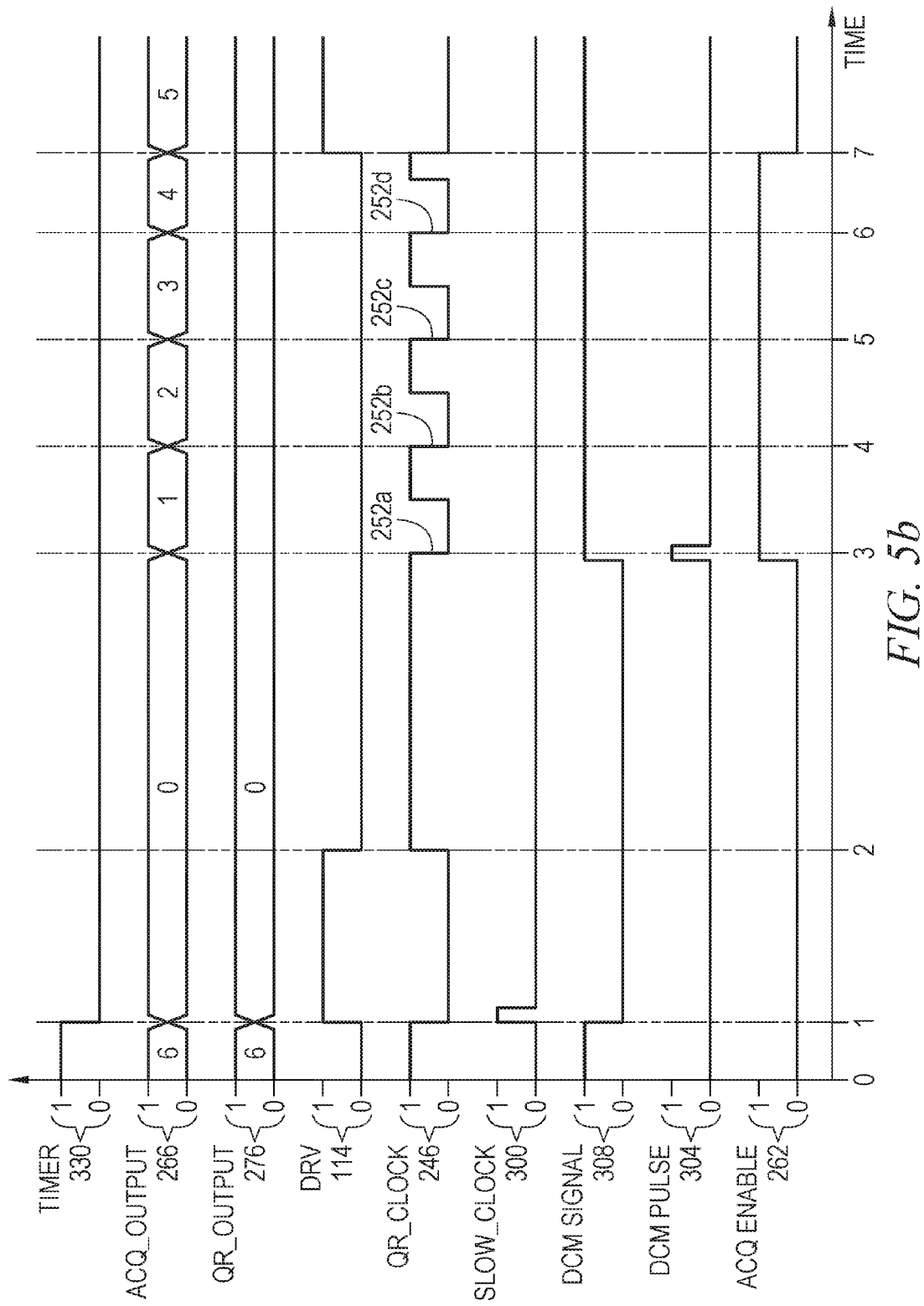

FIG. 5b illustrates a timing diagram of the circuit in FIG. 5a. At time 0, acquisition counter output 266 is set at six, indicating that the power output of SMPS 100 at the last slow clock 300 pulse was such that MOSFET 112 should be turned on at the sixth valley 252f. Also at time 0, an internal timer signal 330 is a logic one value. Timer signal 330 being a logic one indicates that slow clock 300 should assert for the next power cycle of SMPS 100. Timer 330 is implemented as a digital counter or analog timer, e.g., based on an RC time constant. When the timer is implemented as an analog timer, a comparator compares a capacitor's voltage potential against a threshold as the capacitor is charged. Timer signal 330 is asserted when the voltage ramp exceeds the threshold.

At time 1 in FIG. 5b, QR clock 246 transitions to a logic zero value based on drain terminal 115 entering a valley 252. Because the value stored in acquisition counter 260 is equal to the value stored in QR counter 262, the predetermined number of valleys have been skipped and MOSFET 112 is turned on by DRV signal 114 to begin the next power cycle. Slow clock 300 is asserted combinationally when both timer 330 and DRV 114 are logic one values. Therefore, slow clock 300 transitions to a logic one value at time 1 in response to MOSFET 112 being turned on while timer 330 is high.

The pulse of slow clock 300 beginning at time 1 triggers DCM detection block 310 to lower DCM signal 308. The pulse of slow clock 300 also clears timer 330 and resets the underlying timing mechanism. The negative transition of timer 330 clears slow clock 300 in turn. Therefore, the pulse of slow clock 300 lasts just long enough for the propagation of a signal through the combinational logic required to clear timer 330 and then return to clear slow clock 300.

At time 2, MOSFET 112 is turned off by PWM block 322 comparing CS node 119 against FB node 160. Main clock 320 transitions from a logic one value to a logic zero value, which causes a similar transition in DRV signal 114. QR clock 246 transitions to a logic one because turning MOSFET 112 off begins plateau 253. Between time 2 and time 3, transformer 105 discharges stored magnetic energy as electric current induced through secondary winding 108. When transformer 105 is demagnetized just prior to time 3, ringing 250 begins.

Initially, DCM detection block 310 comparing ZCD node 240 against a threshold higher than the threshold for QR clock 246 asserts DCM signal 308 prior to the falling edge of QR clock 246. DCM pulse 304 sets SR latch 302 to assert acquisition enable signal 262 prior to ZCD node 240 falling sufficiently for a negative transition of QR clock 246. QR clock 246 transitions to a logic zero as the first valley 252 is reached at time 3, and acquisition output 266 is incremented. Subsequent negative transitions of QR clock 246 at times 4, 5, 6, and 7 also increment acquisition counter 260, which reaches a value of five at time 7.

At time 7 in FIG. 5b, PWM block 322 asserts main clock 320, which controls DRV signal 114 for the present power cycle because of slow clock 300 kicking DCM detection block 310 out of DCM. The timing of PWM block 322 turning on MOSFET 112 is controlled by the output power of SMPS 100, determined by observing FB node 160. Turning on MOSFET 112 connects drain terminal 115 to ground node 113 through resistor 118, and QR clock 246 becomes a logic zero value at that time rather than based on ringing 250 reaching a valley 252. Main clock 320, which causes DRV signal 114 to assert at time 7, is routed through delay circuit 324 and resets SR latch 302 just after time 7, clearing acquisition enable signal 262. Delay circuit 324 ensures that the negative transition of QR clock 246 increments acquisition counter 260 at time 7 before the acquisition counter is disabled. MOSFET 112 was turned on by PWM block 322 after four valleys 252 were skipped, and acquisition counter 260 stores the value five after the power cycle is completed at time 7. Five is less than the previous value stored in acquisition counter 260, six, so the power output of SMPS 100 has increased since a previous pulse of slow clock 300.

Figure 6A:
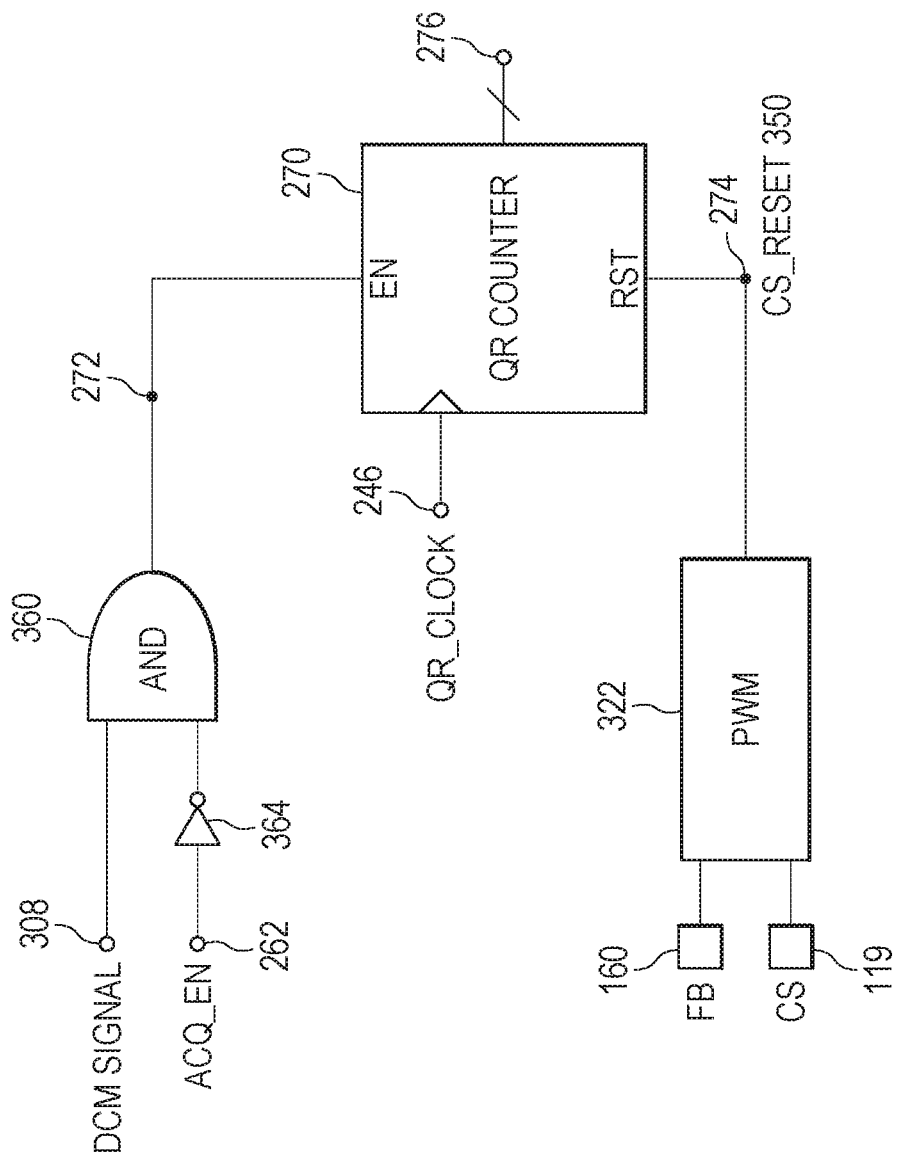
FIGS. 6a-6b illustrate tracking an instantaneous valley number for comparison against the reference valley number.

After acquisition of a reference valley number as illustrated in FIGS. 5a-5b, SMPS 100 operates by switching in the valley indicated by acquisition counter 260 until another pulse of slow clock 300. FIG. 6a illustrates a block diagram for controlling QR counter 270 to count valleys 252 of ringing 250 for comparison against acquisition counter 260 by comparator 280. QR counter 270 is reset every power cycle by CS reset signal 350 routed to reset input 274 of the QR counter. CS reset 350 is a pulse from PWM block 322 that turns off MOSFET 112 based on comparing CS node 119 against FB node 160. CS reset 350 resets QR counter 270 each power cycle so that the QR counter begins counting valleys 252 from zero for the power cycle.

QR enable signal 272 is generated by AND gate 360. QR counter 270 is enabled as long as DCM signal 308 is a logic one value and acquisition enable signal 262 is a logic zero value. QR counter 270 increments on each negative transition of QR clock 246 as long as SMPS 100 is in DCM and not acquiring a new reference valley number in acquisition counter 260. Inverter 364 inverts acquisition enable signal 262 for input to AND gate 360. In other embodiments, SR latch 302 includes a Q-bar output that is an inverse of acquisition enable signal 262, so no separate inverter 364 is required.

Figure 6B:
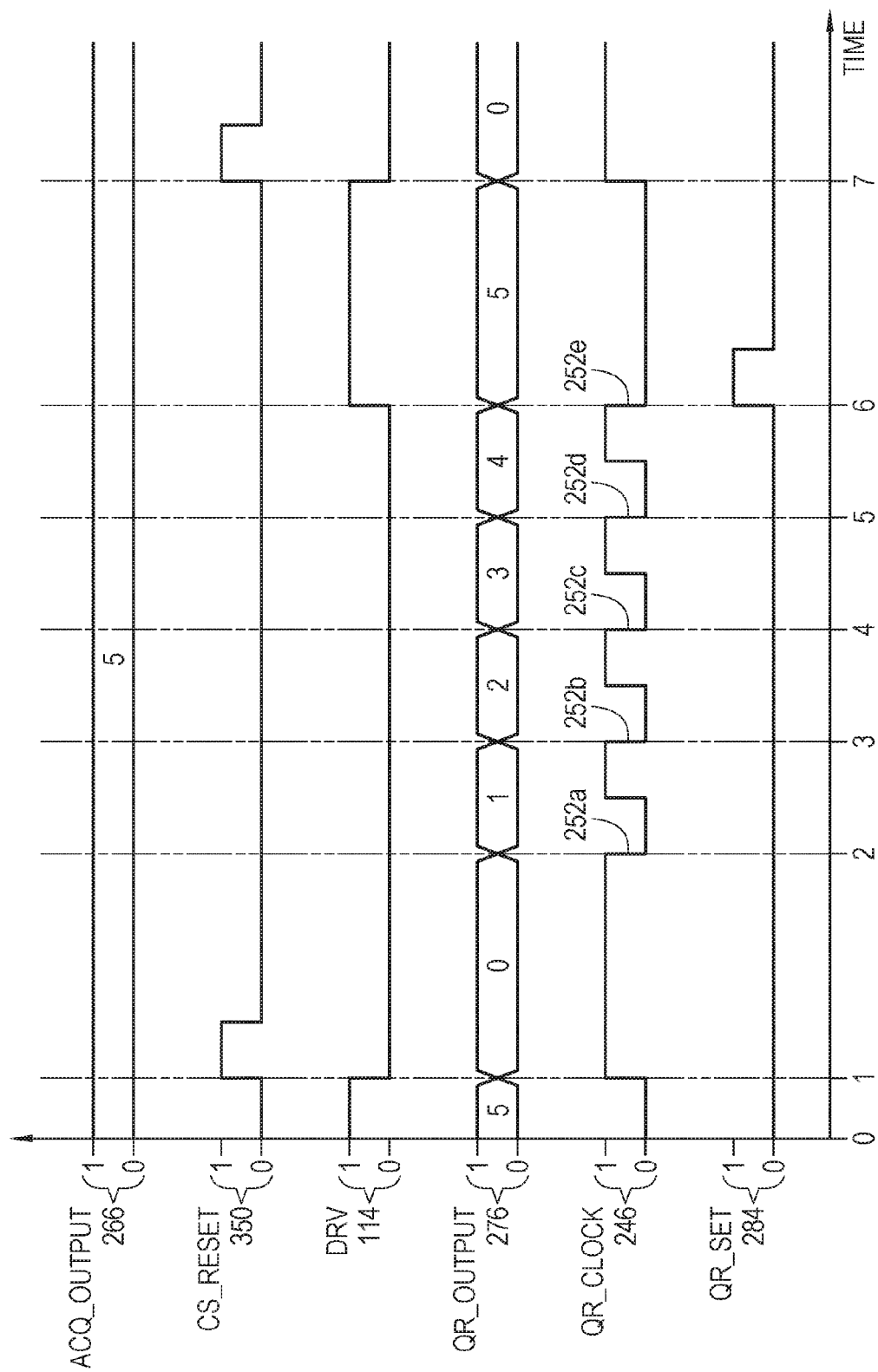

FIG. 6b illustrates a timing diagram of QR counter 270 being compared against acquisition counter 260 to determine when to turn MOSFET 112 on. Acquisition counter 260 stored the value five after the previous pulse of slow clock 300, as illustrated in FIG. 5b. QR output 276 begins at time 0 with the value five because the QR counter stopped counting when MOSFET 112 turned on last power cycle. At time 1, PWM block 322 turns off MOSFET 112 by pulsing CS reset 350. Transformer 105 demagnetizes from time 1 to time 2, and ringing 250 begins at time 2. Valleys 252a-252e cause negative transitions of QR clock 246 at times 2, 3, 4, 5, and 6. Each negative transition of QR clock 246 increments QR counter 270 until output 276 increments to the value five at time 6. At time 6, when QR counter 270 is incremented to five, comparator 280 observes output 276 is equal to output 266 and triggers a pulse from pulse generator 282 on QR set 284. DRV signal 114 is asserted by the QR set 284 pulse to turn MOSFET 112 on. MOSFET 112 turns on in a valley 252 because negative transitions of QR clock 246 occur during the valleys. MOSFET 112 is turned on by DRV signal 114 from time 6 to time 7 when CS reset 350 is again pulsed to turn off MOSFET 112. QR counter 270 is reset by the pulse of CS reset 350.

Controller 120 continues turning on MOSFET 112 each power cycle once the value in QR counter 270 reaches the value stored in acquisition counter 260. Peak current of SMPS 100 is free to fluctuate and controller 120 continues switching in the same valley number. During valley lockout, controller 120 selects a valley for switching on MOSFET 112 independently from the voltage potential of FB node 160. The valley number selected for switching only depends on comparing digital counters. Increasing the maximum valley number for switching only requires increasing the number of bits for acquisition counter 260 and QR counter 270. Adding one bit to each counter doubles the maximum valley number for switching, whereas valley switching based on FB node 160 thresholds requires multiple comparators per additional valley.

Figure 7:
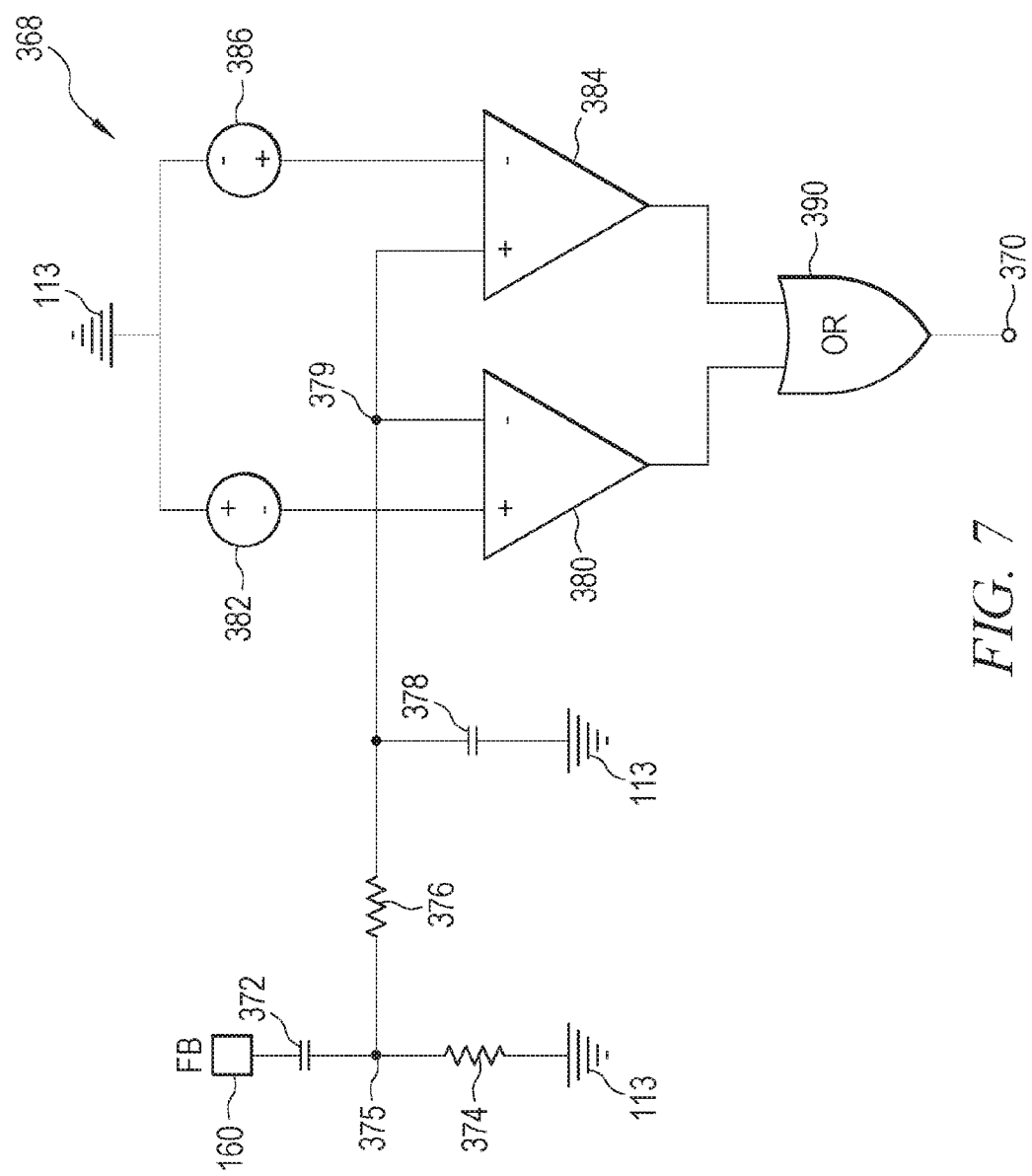
FIG. 7 illustrates feedback slope detection for prematurely terminating valley lockout.

As discussed above, the acquisition frequency based on slow clock 300 may be adjusted based on a voltage potential on FB node 160. FIG. 7 illustrates a circuit 368 for detecting when the rate of change of the feedback voltage at FB node 160 exceeds a threshold. Movement of the feedback voltage exceeding a threshold, perhaps due to a sudden load variation or change of input voltage of SMPS 100, causes circuit 368 to assert a valley lockout escape signal 370. Valley lockout escape signal 370 causes controller 120 to immediately re-acquire a new valley to switch in, rather than waiting for the next pulse of slow clock 300. In some embodiments, the frequency of slow clock 300 is also increased after assertion of escape signal 370.

Circuit 368 receives FB node 160 as an input. FB node 160 is connected to ground node 113 through capacitor 372 and resistor 374. Capacitor 372 allows changes in the feedback voltage to flow through the capacitor as electric current. Resistor 374 converts the electric current through capacitor 372 to a voltage potential at circuit node 375 proportional to the rate of change of the feedback voltage. Resistor 376 and capacitor 378 create a low-pass filter between circuit node 375 and circuit node 379. Circuit node 379 is routed to comparators 380 and 384.

Comparator 380 compares the voltage potential at circuit node 379 against a negative voltage threshold 382. Circuit node 379 represents a rate of change of the feedback voltage at FB node 160. If the voltage potential at circuit node 379 falls below the negative voltage potential of negative voltage threshold 382, the feedback voltage at FB node 160 is falling at a rate that is above the desired threshold. The output of comparator 380 to OR gate 390 is asserted, and escape signal 370 is asserted by OR gate 390.

Comparator 384 compares the voltage potential at circuit node 379 against a positive voltage threshold 386. If the voltage potential at circuit node 379 increases above the voltage potential of voltage threshold 386, the feedback voltage at FB node 160 is increasing at a rate that is above the desired threshold. The output of comparator 384 is asserted, and escape signal 370 is asserted by OR gate 390. Circuit 368 allows controller 120 to react when the feedback voltage changes suddenly without waiting until slow clock 300 is next asserted. Acquisition counter 260 is immediately reset and enabled after escape signal 370 is asserted, rather than waiting for timer signal 330 to assert slow clock 300. While circuit 368 is illustrated as implemented with analog comparators, escape signal 370 may be generated using digital values and digital comparators in other embodiments.

Figure 8:
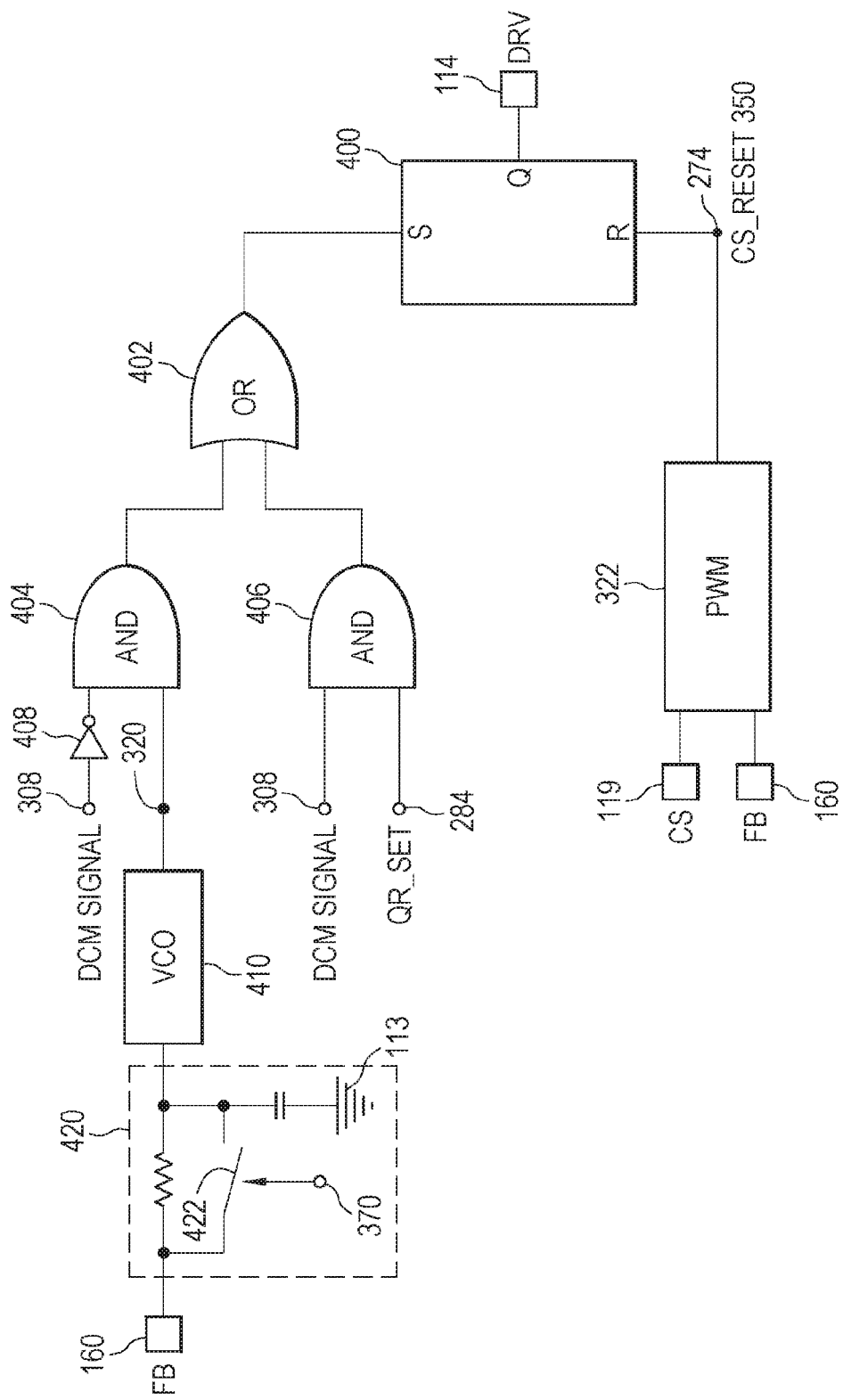
FIG. 8 illustrates feedback loop slowdown using a low-pass filter.

FIG. 8 illustrates generation of DRV signal 114 to MOSFET 112 by SR latch 400. SR latch 400 is set every power cycle by OR gate 402 in conjunction with one of AND gate 404 or AND gate 406. DCM signal 308 determines which AND gate 404-406 is operable to set SR latch 400. When SMPS 100 is operating in CCM or VCO mode, DCM signal 308 is inverted by inverter 408 and received at AND gate 404 as a logic one. The status of main clock 320 controls the set input of SR latch 400 through AND gate 404 and OR gate 402. AND gate 406 receives a logic zero from DCM signal 308 and holds the output of AND gate 406 de-asserted regardless of the state of QR set 284.

While SMPS 100 operates in DCM, DCM signal 308 is asserted to AND gate 406. QR set 284 controls the set input of SR latch 400 through AND gate 406 and OR gate 402. Inverter 408 outputs a logic zero so AND gate 404 outputs a logic zero regardless of the state of main clock 320. Therefore, SR latch 400 is set and turns on MOSFET 112 when QR set 284 is high in DCM, or SR latch 400 is set when main clock 320 is high when SMPS 100 is not in DCM.

VCO 410 generates main clock 320 based on the feedback signal at FB node 160. A low-pass filter (LPF) 420 is electrically coupled between FB node 160 and VCO node 410 to slow down the VCO control loop. LPF 420 is illustrated as a resistor-capacitor (RC) filter, but other LPF topologies are used in other embodiments. In one embodiment, a digital LPF is used for LPF 420. LPF 420 includes a switch 422 that is normally open, but closed when escape signal 370 is asserted by circuit 368. Escape signal 370 closes, or turns on, when the rate of change of FB node 160 is detected to be above a threshold. Closing switch 422 shorts out LPF 420 so that VCO 410 receives the feedback signal from FB node 160 without the delay of LPF 420.

SR latch 400 is reset by CS reset 350 to turn off MOSFET 112 each power cycle. CS reset 350 is generated by comparison between CS node 119 and FB node 160 as described with regard to FIG. 6a.

While one or more embodiments have been illustrated and described in detail, the skilled artisan will appreciate that modifications and adaptations to those embodiments may be made without departing from the scope of the present disclosure.

What is claimed:

1. A method of controlling a power supply, comprising:
providing a power switching transistor in the power supply;
providing a counter;
enabling the counter when the power supply enters discontinuous conduction mode (DCM);
counting a first number of a plurality of resonant voltage valleys occurring at a conduction terminal of the power switching transistor to establish a first threshold;
counting a second number of the resonant voltage valleys occurring at the conduction terminal of the power switching transistor;
enabling conduction of the power switching transistor in response to a feedback signal when the second number of the resonant voltage valleys counted reaches the first threshold; and
counting the first number of the resonant voltage valleys occurring prior to the feedback signal enabling the power switching transistor to establish the first threshold.

2. The method of claim 1, further including resetting the counter when a timer expires.

3. The method of claim 1, further including determining the first threshold periodically.

4. The method of claim 1, wherein counting the second number of the resonant voltage valleys includes
resetting the counter when the power switching transistor becomes non-conductive.

5. A method of controlling a power supply, comprising:
providing a power supply including a transistor;
counting a first number of resonant voltage valleys of the power supply;
enabling conduction of the transistor when the first number of resonant voltage valleys counted reaches a first threshold; and
determining the first threshold when a rate of change of a feedback signal of the power supply exceeds a second threshold.

6. A power supply controller, comprising:
a power switching transistor;
a first counter configured to count a first number of resonant voltage valleys to establish a first threshold;
a second counter configured to count a second number of resonant voltage valleys, wherein the resonant voltage valleys occur at a conduction terminal of the power switching transistor; and
a comparator coupled to an output of the first counter and an output of the second counter to provide an enabling output signal of the power supply controller when the second number of resonant voltage valleys counted reaches the first threshold.

7. The power supply controller of claim 6, further including a slope detection circuit coupled to a feedback input of the power supply controller and configured to reset the first counter.

8. The power supply controller of claim 6, further including a timer configured to reset the first counter.

9. The power supply controller of claim 6, further including a pulse generator coupled to an output of the comparator.

10. A method of controlling a power supply, comprising:
providing a power supply including a transistor;
counting a first number of a plurality of resonant voltage valleys of the power supply;
counting a second number of the resonant voltage valleys of the power supply to determine a first threshold;
determining the first threshold when a rate of change of a feedback signal of the power supply exceeds a second threshold; and
enabling conduction of the transistor when the first number of the resonant voltage valleys counted reaches the first threshold.

11. The method of claim 10, wherein counting the second number of the resonant voltage valleys includes:
providing a counter; and
enabling the counter when the power supply enters discontinuous conduction mode (DCM).

12. The method of claim 11, further including resetting the counter when a timer expires.

13. The method of claim 10, further including determining the first threshold periodically.

14. The method of claim 10, wherein counting the first number of resonant voltage valleys includes:
providing a counter; and
resetting the counter when the transistor becomes non-conductive.

15. A method of controlling a power supply, comprising:
providing a power supply including a transistor;
providing a feedback signal from an output of the power supply;
counting a first number of resonant voltage valleys of the power supply;
counting a second number of resonant voltage valleys to determine a first threshold;
enabling conduction of the transistor when the first number of resonant voltage valleys counted reaches the first threshold; and
detecting a slope of the feedback signal to reset the first counter.

16. The method of claim 15, further including providing a low-pass filter for the feedback signal.

* * * * *